United States Patent
Kuki

(10) Patent No.: US 9,890,673 B2
(45) Date of Patent: Feb. 13, 2018

(54) HONEYCOMB FILTER

(71) Applicant: NGK INSULATORS, LTD., Nagoya (JP)

(72) Inventor: Tatsuyuki Kuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 148 days.

(21) Appl. No.: 15/062,609

(22) Filed: Mar. 7, 2016

(65) Prior Publication Data

US 2016/0273426 A1    Sep. 22, 2016

(30) Foreign Application Priority Data

Mar. 16, 2015 (JP) ................. 2015-051810

(51) Int. Cl.
| | |
|---|---|
| *B01D 50/00* | (2006.01) |
| *F01N 3/022* | (2006.01) |
| *B01D 46/24* | (2006.01) |
| *F01N 3/035* | (2006.01) |

(Continued)

(52) U.S. Cl.
CPC ......... *F01N 3/0222* (2013.01); *B01D 46/247* (2013.01); *B01D 46/2425* (2013.01); *B01D 46/2429* (2013.01); *B01D 46/2459* (2013.01); *B01D 46/2474* (2013.01); *F01N 3/035* (2013.01); *B01D 53/9418* (2013.01); *B01D 53/96* (2013.01); *B01D 2046/2481* (2013.01); *B01D 2046/2496* (2013.01); *B01D 2255/2092* (2013.01); *B01D 2255/20707* (2013.01); *B01D 2255/20723* (2013.01); *B01D 2255/30* (2013.01); *B01D 2255/50* (2013.01); *B01D 2255/9155* (2013.01);

(Continued)

(58) Field of Classification Search
CPC ... F01N 3/0222; F01N 3/035; B01D 46/2429; B01D 46/2474; B01D 2255/20707; B01D 2255/30

USPC .............................. 422/180; 55/523; 428/116
See application file for complete search history.

(56) References Cited

U.S. PATENT DOCUMENTS

| | | |
|---|---|---|
| 7,556,782 B2 | 7/2009 | Ohno et al. |
| 7,785,695 B2 | 8/2010 | Ohno et al. |
| 7,846,527 B2 | 12/2010 | Furuta |

(Continued)

FOREIGN PATENT DOCUMENTS

| | | |
|---|---|---|
| JP | 4471622 B2 | 6/2010 |
| WO | 2008/078799 A1 | 7/2008 |
| WO | 2008/117559 A1 | 10/2008 |

OTHER PUBLICATIONS

German Office Action (Application No. 10 2016 002 708.8) dated Dec. 2, 2016 (with English translation).

*Primary Examiner* — Tom P Duong
(74) *Attorney, Agent, or Firm* — Burr & Brown, PLLC

(57) ABSTRACT

A honeycomb filter, wherein when a thermal expansion coefficient at 300 to 600° C. of a material constituting a honeycomb substrate is indicated by A ($\times 10^{-6}$/° C.), the four-point bending strength of the material constituting the honeycomb substrate is indicated by B (MPa), the thickness of a thinnest portion in a portion partitioning outlet plugging cells of a partition wall 1 is indicated by t (mm), the thickness of a portion partitioning an outlet plugging cell and an inlet plugging cell of the partition wall is indicated by WT (mm), and the distance between the center of the outlet plugging cell and the center of the inlet plugging cell adjacent to each other is indicated by CP (mm), a relation of the following equation (1) is satisfied.

$$0.714 \times WT + 0.160 \geq t/CP \geq 0.163 \times A/B + 0.105 \qquad (1)$$

8 Claims, 4 Drawing Sheets

(51) Int. Cl.
  *B01D 53/94*  (2006.01)
  *B01D 53/96*  (2006.01)

(52) U.S. Cl.
  CPC .. *B01D 2255/9202* (2013.01); *F01N 2330/30* (2013.01); *F01N 2330/34* (2013.01)

(56) References Cited

U.S. PATENT DOCUMENTS

| | | |
|---|---|---|
| 8,470,430 B2 | 6/2013 | Hiramatsu |
| 2006/0188415 A1 | 8/2006 | Ohno et al. |
| 2006/0194018 A1 | 8/2006 | Ohno et al. |
| 2009/0274867 A1 | 11/2009 | Hiramatsu |
| 2009/0297766 A1 | 12/2009 | Furuta |
| 2015/0037221 A1 | 2/2015 | Shibata et al. |

HONEYCOMB FILTER

The present application is an application based on JP 2015-051810 filed on Mar. 16, 2015 with the Japan Patent Office, the entire contents of which are incorporated herein by reference.

BACKGROUND OF THE INVENTION

Field of the Invention

The present invention relates to a honeycomb filter that removes particulate matter (hereinafter, referred to as "PM") in an exhaust gas emitted from an internal combustion engine such as a diesel engine.

Description of the Related Art

An exhaust gas emitted from an internal combustion engine such as a diesel engine includes a large amount of PM such as soot mainly containing carbon polluting an environment. For that reason, a filter for removing (trapping) PM is generally mounted on an exhaust system of a diesel engine or the like.

As a filter used for such a purpose, a honeycomb filter formed of a ceramic material is widely used. In general, the honeycomb filter includes a honeycomb substrate and a plugging portion. The honeycomb substrate includes a porous partition wall defining a plurality of cells extending from an inflow end face as an end face to which a fluid flows to an outflow end face as an end face from which a fluid flows. When a plugging portion plugging one end of each cell is disposed in any end face of the honeycomb substrate, the honeycomb filter can be obtained.

When such a honeycomb filter is used to remove PM contained in an exhaust gas, the exhaust gas flows from the inflow end face of the honeycomb filter into the cell of which an end near the outflow end face is plugged. Subsequently, the exhaust gas passes through the porous partition wall and flows inside the cell of which the end is plugged at the inflow end face. Then, when the exhaust gas passes through the porous partition wall, the partition wall functions as a filtration layer and PM in the exhaust gas is trapped by the partition wall so that the PM is accumulated on the partition wall. In this way, the exhaust gas from which the PM is removed flows outward from the outflow end face.

In recent years, as one of the honeycomb filters, there is proposed a honeycomb filter in which the cross-sectional area of an exhaust gas inflow side cell is larger than the cross-sectional area of an exhaust gas outflow side cell (for example, see Patent Documents 1 and 2). The honeycomb filter with such a structure has an advantage capable of suppressing a problem in which the exhaust gas inflow side cell (the cell of which an end at the outflow end face is plugged) is blocked by PM accumulated on the partition wall.

Further, in order to suppress a breakage such as a crack caused by thermal stress in a portion near the outflow end face of the honeycomb filter when the honeycomb filter is regenerated, a honeycomb filter is proposed in which a weak portion is densified (for example, see Patent Document 3). In order to continuously use the honeycomb filter for a long period of time, the filter needs to be periodically regenerated. That is, in order to return the filter performance to the initial state by reducing the pressure loss increased by the PM accumulated inside the honeycomb filter with time, the PM accumulated inside the filter needs to be burned and removed. During the regeneration of the filter, the PM accumulated inside the filter is burned sequentially from the inflow side end face. For that reason, in the portion which is closer to the outflow side end face, the temperature caused by the heat generated at the front side (the upstream side) and the heat generated by the combustion of the PM at that portion abruptly increases. Thus, a problem arises in that the temperature in each portion of the filter increases non-uniformly and a breakage such as a crack easily occurs in a portion near the outflow end face of the honeycomb filter due to the thermal stress. In the honeycomb filter proposed in Patent Document 3, the heat capacity and the heat transfer efficiency in a portion near the outflow end face increase by densifying the portion. As a result, an increase in temperature in a portion near the outflow end face during the regeneration of the filter is suppressed and hence a breakage caused by the thermal stress hardly occurs in that portion.

[Patent Document 1] JP-B-4471622
[Patent Document 2] WO 2008/117559
[Patent Document 3] WO 2008/078799

SUMMARY OF THE INVENTION

Incidentally, in recent years, An SCR catalyst for purify nitrogen oxide ($NO_x$) in an exhaust gas may be loaded onto a honeycomb filter may load in accordance with a strengthened regulation for the exhaust gas. Furthermore, "SCR" substantially indicates "Selective Catalytic Reduction", and the "SCR catalyst" indicates a catalyst (a selective reduction catalyst) which reduces a target purifying element by a reduction reaction. Further, in order to improve the filter regeneration efficiency, An oxidization catalyst for promoting the combustion of PM may be loaded onto the honeycomb filter.

In this way, when a catalyst is loaded onto the honeycomb filter, there is a need to increase the porosity of the honeycomb substrate or to thin the partition wall in order to suppress an increase in pressure loss caused by the loaded catalyst. As a result, the thermal shock resistance of the honeycomb filter decreases. For this reason, when a sudden change in temperature occurs in the honeycomb filter onto which the catalyst is loaded during the regeneration of the filter, a problem arises in that a breakage such as a crack easily occurs in a portion near the inflow end face as well as a portion near the outflow end face.

The present invention is made to solve the problems of the related art. An object of the present invention is to provide a honeycomb filter capable of preventing a breakage such as a crack caused by thermal stress in a portion near an inflow end face as well as a portion near an outflow end face by exhibiting high thermal shock resistance even when the porosity of a honeycomb substrate is increased or a partition wall is thinned.

According to the present invention, a honeycomb filter below is provided.

[1] A honeycomb filter includes: a honeycomb substrate which includes a porous partition wall defining a plurality of cells functioning as fluid channels and extending from an inflow end face as an end face to which a fluid flows to an outflow end face as an end face from which a fluid flows; and a plugging portion which is disposed in any one end of the inflow side end face and the outflow side end face in the plurality of cells, wherein a part of the plurality of cells is an inlet plugging cell of which an end near the inflow side end face of the honeycomb substrate is plugged by the plugging portion and the other of the plurality of cells is an outlet plugging cell of which an end near the outflow side end face of the honeycomb substrate is plugged by the plugging portion, wherein in a cross-section orthogonal to the extension direction of the cell, the cross-sectional area of the outlet plugging cell is larger than the cross-sectional area of the inlet plugging cell, wherein the outlet plugging cell and the inlet plugging cell are disposed alternately and adjacently while being partitioned by the partition wall in two orthogonal directions in the cross-section and the outlet plugging cells are continuously and adjacently disposed while being partitioned by the partition wall in a direction in which the outlet plugging cells are inclined with respect to two orthogonal directions in the cross-section, wherein when the thermal expansion coefficient at 300 to 600° C. of a material constituting the honeycomb substrate is indicated by A ($\times 10^{-6}$/° C.), the four-point bending strength of the material constituting the honeycomb substrate is indicated by B (MPa), the thickness of a thinnest portion in a portion partitioning the outlet plugging cells in the partition wall is indicated by t (mm), the thickness of a portion partitioning the outlet plugging cell and the inlet plugging cell in the partition wall is indicated by WT (mm), and the distance between the center of the outlet plugging cell and the center of the inlet plugging cell adjacent to each other is indicated by CP (mm), a relation of the following equation (1) is satisfied.

$$0.714 \times WT + 0.160 \geq t/CP \geq 0.163 \times A/B + 0.105 \quad (1)$$

[2] The honeycomb filter according to above [1], wherein a relation of the following equation (2) is satisfied.

$$t/CP \geq 0.145 \times A/B + 0.160 \quad (2)$$

[3] The honeycomb filter according to above [1] or [2], wherein a relation of the following equation (3) is satisfied.

$$0.714 \times WT + 0.132 \geq t/CP \quad (3)$$

[4] The honeycomb filter according to above [1] or [2], wherein a relation of the following equation (4) is satisfied.

$$0.714 \times WT + 0.104 \geq t/CP \quad (4)$$

[5] The honeycomb filter according to any one of above [1] to [4], wherein the honeycomb substrate is obtained by monolithically bonding a plurality of segments having a honeycomb structure.

[6] The honeycomb filter according to any one of above [1] to [5], wherein a material constituting the honeycomb substrate is ceramics of at least one selected from the group consisting of silicon carbide, a silicon-silicon carbide-based composite material, silicon nitride, cordierite, mullite, alumina, a silicon carbide cordierite-based composite material, and aluminium titanate.

[7] The honeycomb filter according to any one of above [1] to [6], wherein a portion partitioning the outlet plugging cells in the partition wall has a non-uniform thickness.

[8] The honeycomb filter according to any one of above [1] to [7], wherein an exhaust gas purifying catalyst is loaded onto the partition wall.

The honeycomb filter of the present invention satisfies a predetermined relation in the thermal expansion coefficient of the material constituting the honeycomb substrate, the four-point bending strength of the material constituting the honeycomb substrate, the thickness of a predetermined portion of the partition wall, and the distance between the predetermined cells. Since such a relation is satisfied, the honeycomb filter of the present invention exhibits high thermal shock resistance even when the porosity of the honeycomb substrate is increased or the partition wall is thinned. For this reason, when a sudden change in temperature occurs in the honeycomb filter of the present invention during the regeneration of the filter, a breakage such as a crack hardly occurs in a portion near the inflow end face as well as a portion near the outflow end face of the honeycomb substrate. Further, even when PM such as soot is accumulated inside the honeycomb filter of the present invention, the pressure loss hardly increases and an influence on the engine output caused by the accumulation of the PM is small. For that reason, the honeycomb filter of the present invention can be appropriately used as a filter such as DPF for purifying an exhaust gas including a large amount of PM.

DESCRIPTION OF THE PREFERRED EMBODIMENTS

Hereinafter, embodiments of the present invention will be described. The present invention is not limited to the embodiments below, and the embodiments below can be, of course, appropriately modified and improved based on the general knowledge of the person skilled in the art without departing from the spirit of the present invention. Then, these modifications and improvements are also included in the scope of the present invention.

Figure 1:
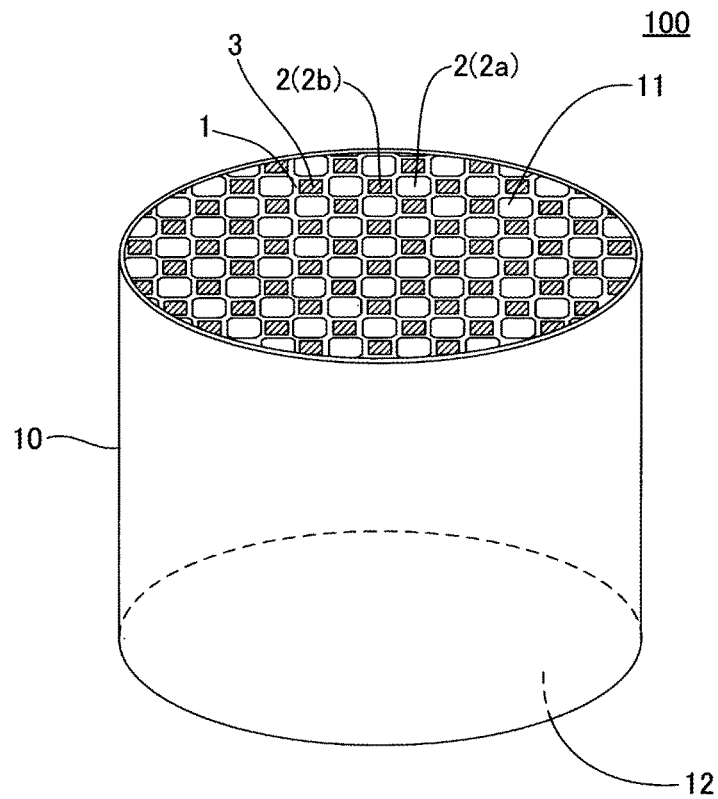
FIG. 1 is a perspective view schematically showing a honeycomb filter according to an embodiment of the present invention.
Figure 2:
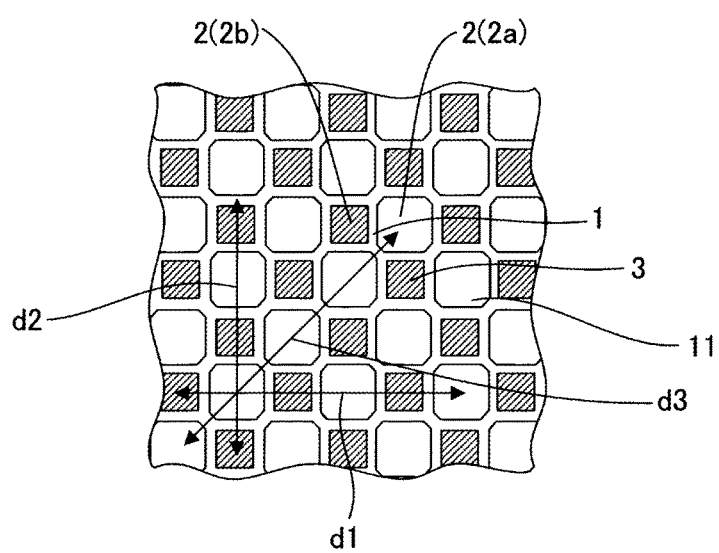
FIG. 2 is a partially enlarged cross-sectional view showing an inflow end face of a honeycomb substrate of the honeycomb filter according to the embodiment of the present invention.
Figure 3:
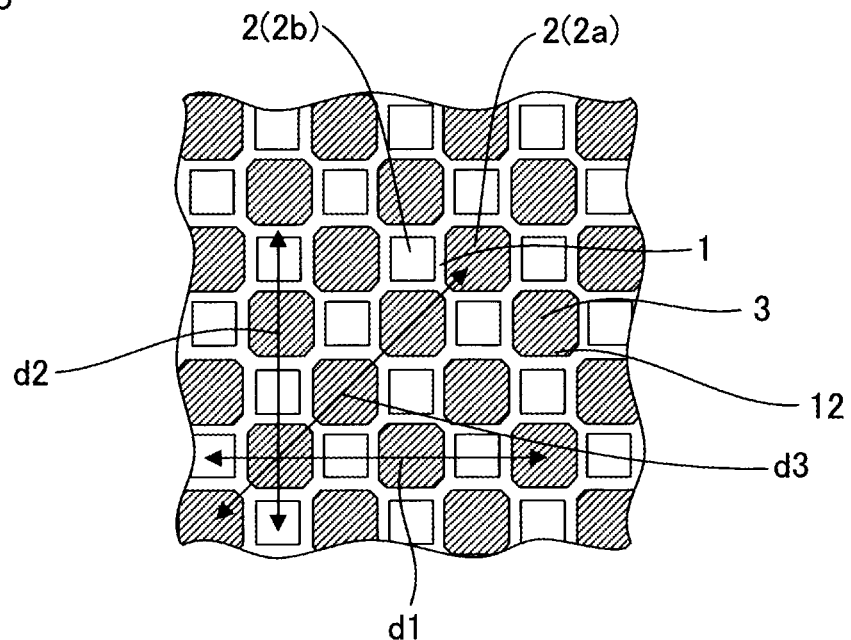
FIG. 3 is a partially enlarged cross-sectional view showing the outflow end face of the honeycomb substrate of the honeycomb filter according to the embodiment of the present invention.
Figure 4:
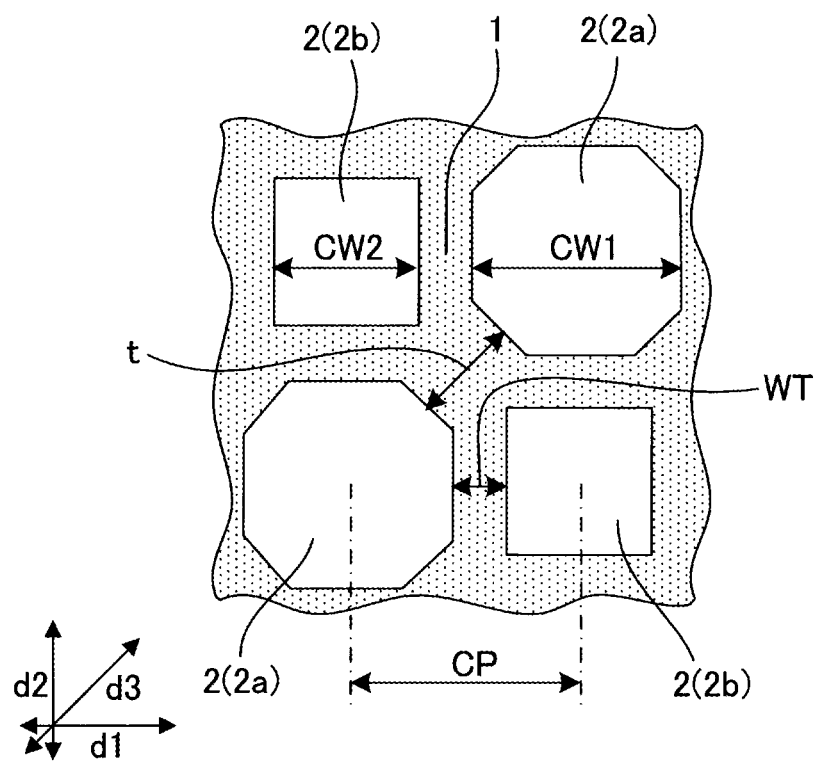
FIG. 4 is a partially enlarged cross-sectional view showing a cross-section orthogonal to the extension direction of a cell of the honeycomb substrate of the honeycomb filter according to the embodiment of the present invention.
Figure 5:
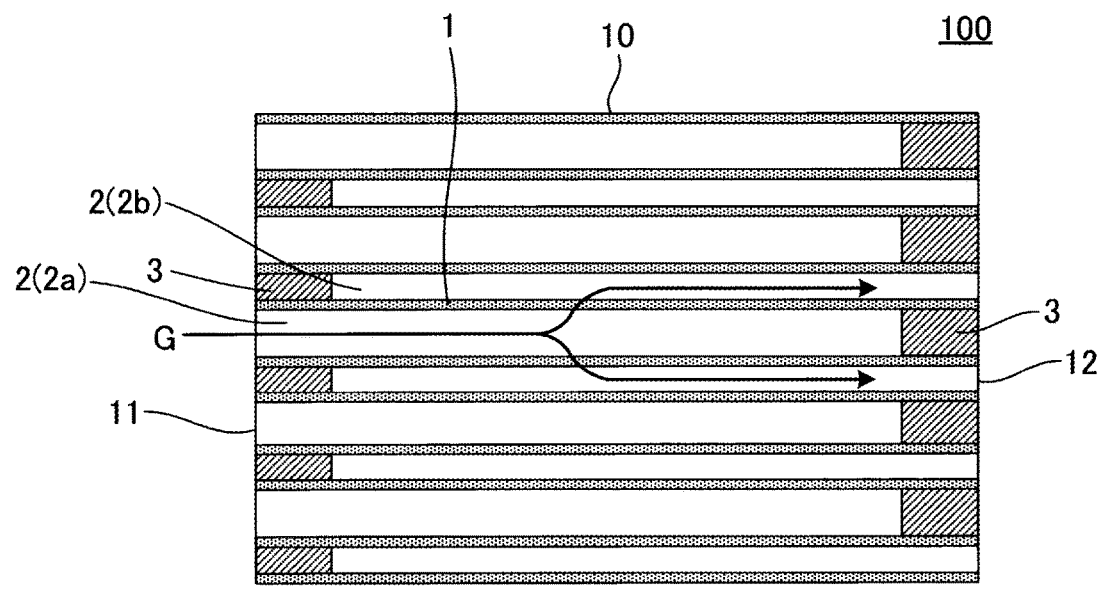
FIG. 5 is a partially enlarged cross-sectional view showing a cross-section parallel to the extension direction of the cell of the honeycomb substrate of the honeycomb filter according to the embodiment of the present invention.

(1) Honeycomb Filter:

FIG. 1 is a perspective view schematically showing a honeycomb filter according to an embodiment of the present invention. FIG. 2 is a partially enlarged cross-sectional view showing an inflow end face of a honeycomb substrate of the honeycomb filter according to the embodiment of the present invention. FIG. 3 is a partially enlarged cross-sectional view showing an outflow end face of the honeycomb substrate of the honeycomb filter according to the embodiment of the present invention. FIG. 4 is a partially enlarged cross-sectional view showing a cross-section orthogonal to the extension direction of a cell of a honeycomb substrate of the honeycomb filter according to the embodiment of the present invention. FIG. 5 is a partially enlarged cross-sectional view showing a cross-section parallel to the extension direction of the cell of the honeycomb substrate of the honeycomb filter according to the embodiment of the present invention.

As shown in these drawings, a honeycomb filter 100 includes a honeycomb substrate 10 and a plugging portion 3. The honeycomb substrate 10 includes a porous partition wall 1 which defines a plurality of cells 2 functioning as fluid channels and extending from an inflow end face 11 as an end face into which a fluid such as an exhaust gas flows to an outflow end face 12 as an end face from which a fluid flows. The plugging portion 3 is disposed in any one end near the inflow end face 11 or the outflow end face 12 of the plurality of cells 2. A part of the plurality of cells 2 is an inlet plugging cell 2b of which an end near the inflow end face 11 of the honeycomb substrate 10 is plugged by the plugging portion 3. Further, the other of the plurality of cells 2 is an outlet plugging cell 2a of which an end near the outflow end face 12 of the honeycomb substrate 10 is plugged by the plugging portion 3. In a cross-section orthogonal to the extension direction of the cell 2, the cross-sectional area of the outlet plugging cell 2a is larger than the cross-sectional area of the inlet plugging cell 2b. The outlet plugging cell 2a and the inlet plugging cell 2b are alternately disposed so as to be adjacent to each other while being partitioned by the partition wall 1 in two orthogonal directions (the directions d1 and d2) in a cross-section orthogonal to the extension direction of the cell 2. Further, the outlet plugging cells 2a are continuously disposed so that the outlet plugging cells 2a are adjacent to each other while being partitioned by the partition wall 1 in a direction (a direction d3) inclined with respect to two orthogonal directions (the directions d1 and d2) in a cross-section orthogonal to the extension direction of the cell 2.

When the honeycomb filter 100 with such a structure is used to remove PM contained in an exhaust gas, an exhaust gas G flows from the inflow end face 11 into the outlet plugging cell 2a, passes through the porous partition wall 1, and moves into the inlet plugging cell 2b. Then, when the exhaust gas G passes through the porous partition wall 1, the partition wall 1 functions as a filtration layer. Accordingly, PM in the exhaust gas G is trapped by the partition wall 1 and is accumulated on the partition wall 1. In this way, the exhaust gas G from which PM is removed flows outward from the outflow end face 12. Furthermore, the honeycomb filter 100 is formed so that the cross-sectional area of the outlet plugging cell 2a is larger than the cross-sectional area of the inlet plugging cell 2b in a cross-section orthogonal to the extension direction of the cell 2. For that reason, the honeycomb filter 100 can suppress a problem in which the outlet plugging cell 2a is blocked by the PM accumulated on the partition wall 1.

The honeycomb filter 100 has the above-described structure and satisfies a relation of the following equation (1). In the following equation (1), "A" indicates the thermal expansion coefficient (unit: $\times 10^{-6}/°$ C.) at the temperature of 300 to 600° C. of the material constituting the honeycomb substrate 10. The thermal expansion coefficient is measured in conformity with JIS R 1618. "B" indicates the four-point bending strength (unit: MPa) of the material constituting the honeycomb substrate 10. The four-point bending strength is measured in conformity with JIS R1601 by a "bending test". "t" indicates the thickness (unit: mm) of the thinnest portion of the portion partitioning the outlet plugging cells 2a in the partition wall 1 (see FIG. 4). "WT" indicates the thickness (unit: mm) of the portion partitioning the outlet plugging cell 2a and the inlet plugging cell 2b in the partition wall 1 (see FIG. 4). "CP" indicates the distance (unit: mm) between the center of the outlet plugging cell 2a and the center of the inlet plugging cell 2b adjacent to each other (see FIG. 4). Furthermore, the "center" in this distance between the centers means the center of the maximal circle included in the cell 2 in a cross-section orthogonal to the extension direction of the cell 2.

$$0.714 \times WT + 0.160 \geq t/CP \geq 0.163 \times A/B + 0.105 \quad (1)$$

The present inventors have examined thermal shock resistance in the honeycomb filters in which the values of A, B, t, WT, and CP were variously changed. As a result, it was found that high thermal shock resistance was obtained even when the porosity of the honeycomb substrate 10 was increased by about 40 to 70% or the thickness of the partition wall 1 was decreased by about 0.1 to 0.3 mm if a relation of $t/CP \geq 0.163 \times A/B + 0.105$ was satisfied. Further, it was found that the pressure loss was not easily increased and the influence on the engine output caused by the accumulation of PM was small even when PM such as soot was accumulated on the honeycomb filter if a relation of $0.714 \times WT + 0.160 \geq t/CP$ was satisfied. Furthermore, when the value of t/CP is smaller than the value to be provided by the following expression: $0.163 \times A/B + 0.105$, high thermal shock resistance is not easily obtained when the porosity of the honeycomb substrate 10 is increased by about 40 to 70% or the thickness of the partition wall 1 is decreased by about 0.1 to 0.3 mm. Further, when the value of t/CP is larger than the value to be provided by the following expression: $0.714 \times WT + 0.160$, the pressure loss obtained when PM such as soot is accumulated on the honeycomb filter increases violently and the influence on the engine output caused by the accumulation of PM increases.

It is desirable that the honeycomb filter 100 satisfies a relation of the following equation (2). When such a relation is satisfied, the honeycomb filter 100 exhibits higher thermal shock resistance.

$$t/CP \geq 0.145 \times A/B + 0.160 \quad (2)$$

Further, it is desirable that the honeycomb filter 100 satisfies a relation of the following equation (3). Then, it is more desirable that the honeycomb filter 100 satisfies a relation of the following equation (4). When such a relation is satisfied, it is possible to more effectively suppress an increase in pressure loss when PM such as soot is accumulated on the honeycomb filter 100.

$$0.714 \times WT + 0.132 \geq t/CP \quad (3)$$

$$0.714 \times WT + 0.104 \geq t/CP \quad (4)$$

Since A, B, t, WT, and CP satisfy a predetermined relation in this way, the honeycomb filter 100 exhibits high thermal shock resistance even when the porosity of the honeycomb substrate 10 is increased or the partition wall 1 is thinned. For this reason, when a sudden change in temperature occurs during the regeneration of the filter, a breakage such as a crack hardly occurs in a portion near the inflow end face 11 as well as a portion near the outflow end face 12 of the honeycomb substrate 10. Further, since the pressure loss is not easily increased and the influence on the engine output caused by the accumulation of PM is small even when PM such as soot is accumulated inside the filter, the honeycomb filter can be appropriately used as a filter such as DPF that purifies an exhaust gas containing a large amount of PM.

Furthermore, in the embodiment shown in FIG. 4, the thickness of the portion partitioning the outlet plugging cells 2a in the partition wall 1 is uniform. However, the present invention is not limited to the embodiment shown in FIG. 4.

Figure 6:
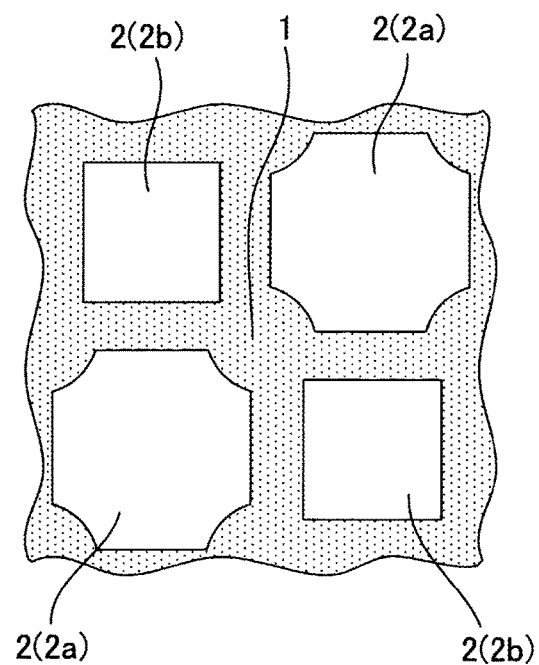
FIG. 6 is a partially enlarged cross-sectional view showing a cross-section orthogonal to the extension direction of a cell of a honeycomb substrate of a honeycomb filter according to another embodiment of the present invention.

For example, the thickness of the portion partitioning the outlet plugging cells 2a of the partition wall 1 may not be uniform as in another embodiment of the present invention shown in FIG. 6.

In the present invention, the value of A is preferably from 1.0 to 7.0 ($\times 10^{-6}/°$ C.), further preferably from 3.0 to 6.0 ($\times 10^{-6}/°$ C.), and especially preferably from 3.5 to 5.5 ($\times 10^{-6}/°$ C.). When the value of A is set to such a range, the honeycomb filter 100 satisfying the relations of the above equations (1) to (4) is easily obtained.

In the present invention, the value of B is preferably from 1 to 60 (MPa), further preferably from 2 to 50 (MPa), and especially preferably from 5 to 45 (MPa). When the value of B is set to such a range, the honeycomb filter 100 satisfying the relations of the above equations (1) to (4) is easily obtained.

In the invention, the value of t is preferably from 0.15 to 0.60 (mm), further preferably from 0.20 to 0.55 (mm), and especially preferably from 0.22 to 0.50 (mm). When the value of t is set to such a range, the honeycomb filter 100 satisfying the relations of the above equations (1) to (4) is easily obtained.

In the invention, the value of WT is preferably from 0.1 to 0.5 (mm), further preferably from 0.1 to 0.4 (mm), and especially preferably from 0.1 to 0.3 (mm). When the value of WT is set to such a range, the honeycomb filter 100 satisfying the relations of the above equations (1) to (4) is easily obtained.

In the invention, the value of CP is preferably from 1.0 to 3.0 (mm), further preferably from 1.1 to 1.8 (mm), and especially preferably from 1.2 to 1.5 (mm). When the value of t is set to such a range, the honeycomb filter 100 satisfying the relations of the above equations (1) to (4) is easily obtained.

The porosity of the honeycomb substrate 10 is preferably from 30 to 80%, further preferably from 35 to 75%, and especially preferably from 40 to 70%. The honeycomb filter 100 exhibits high thermal shock resistance even when the honeycomb substrate 10 has high porosity. Further, when the honeycomb substrate 10 has high porosity, the pressure loss can be suppressed to the extent that the engine output is unaffected even when the catalyst is loaded. Furthermore, the "porosity" is a value measured by a mercury porosimeter.

The average pore diameter of the honeycomb substrate 10 is preferably from 5 to 35 μm, further preferably from 10 to 30 and especially preferably from 15 to 25 μm. When the average pore diameter of the honeycomb substrate 10 is set to such a range, an exhaust gas easily contacts a catalyst loaded on the inner face of the pore of the partition wall 1 when the catalyst is loaded, and hence the exhaust gas purifying efficiency using the catalyst is improved. Furthermore, the "average pore diameter" mentioned herein is a value measured by a mercury porosimeter.

As a material constituting the honeycomb substrate 10, ceramics is preferred. Particularly, at least one ceramics selected from the group consisting of silicon carbide, a silicon-silicon carbide-based composite material, silicon nitride, cordierite, mullite, alumina, a silicon carbide cordierite-based composite material, and aluminium titanate is preferred in terms of having an excellent strength and an excellent heat resistance.

As a material constituting the plugging portion 3, it is desirable to use a material similar to the material constituting the honeycomb substrate 10 since the thermal expansion difference between the plugging portion 3 and the honeycomb substrate 10 is small.

The shape (the outer shape) of the honeycomb substrate 10 is not particularly limited. For example, a round pillar shape or a polygonal pillar shape or the like of which a cross-section orthogonal to the extension direction of the cell 2 has an oval shape, a race track shape, a triangular shape, a square shape, a pentagonal shape, a hexagonal shape, and an octagonal shape or the like can be exemplified.

Further, the cross-sectional shapes of the outlet plugging cell 2a and the inlet plugging cell 2b in a cross-section orthogonal to the extension direction of the cell 2 are not particularly limited. For example, as shown in FIG. 4, the cross-sectional shape of the outlet plugging cell 2a may be formed in an octagonal shape and the cross-sectional shape of the inlet plugging cell 2b may be formed in a square shape. Furthermore, any one of the outlet plugging cell 2a and the inlet plugging cell 2b may be formed so that the cross-sectional shape is formed in a polygonal shape having a corner portion or the corner portion is rounded in an R-shape or an inverse R-shape.

Further, the honeycomb substrate 10 constituting the honeycomb filter 100 may be a honeycomb substrate having a segmented structure (not shown) in which a plurality of honeycomb segments is monolithically bonded. The honeycomb segment includes a porous partition wall which defines a plurality of cells functioning as fluid channels extending from an inflow end face to an outflow end face and an outer wall disposed so as to surround the partition wall. When the plurality of honeycomb segments is monolithically bonded so that the side faces facing each other in a direction orthogonal to the longitudinal direction are combined and bonded by a bonding material, the honeycomb substrate having a segmented structure can be obtained. Furthermore, the plurality of honeycomb segments may be monolithically bonded to one another and the outer circumferences thereof may be ground so that the honeycomb substrate is processed in a predetermined shape such as a round pillar shape. Further, in this case, a coating material may be applied to a face (a processed face) subjected to the grinding so as to form an outer circumferential coating layer.

As the bonding material, slurry is used which is obtained in a manner such that an additive such as an organic binder, foamable resin, and a dispersing agent or the like is added to an inorganic raw material such as an inorganic fiber, colloidal silica, clay, and SiC particle or the like, water is added thereto, and the result is kneaded. As the coating material, a material similar to the material constituting the honeycomb substrate is preferably used.

In the honeycomb filter 100 of the present invention, it is desirable that an exhaust gas purifying catalyst is loaded on the partition wall 1. The catalyst loaded by the partition wall 1 is not particularly limited. For example, an SCR catalyst for purifying nitrogen oxide ($NO_x$) in an exhaust gas or an oxidization catalyst for promoting the combustion of PM accumulated on the partition wall 1 during the regeneration of the filter is exemplified as an appropriate example. As the oxidization catalyst, for example, a catalyst that loads noble metal such as Pt, Pd, and Rh or the like by particles formed of heat-resistant inorganic oxide can be used. As the SCR catalyst, for example, a catalyst that mainly includes at least one selected from the group consisting of vanadium, titania and zeolite causing metal replacement by metal such as Fe and Cu or the like can be used.

The catalyst loading amount is not particularly limited. For example, the catalyst loading amount per unit volume in the honeycomb substrate 10 is preferably from 50 to 250 g/L, further preferably from 50 to 200 g/L, and especially preferably from 50 to 150 g/L. When the catalyst loading amount is smaller than 50 g/L, the purifying performance using the catalyst is not sufficiently exhibited. Further, when the catalyst loading amount exceeds 250 g/L, the pressure loss increases too much.

(2) Manufacturing Method of Honeycomb Filter:

Hereinafter, an example of manufacturing method of a honeycomb filter according to the present invention will be described. First, a forming raw material containing a ceramic raw material is prepared. As the ceramic raw material, at least one selected from the group consisting of silicon carbide, a silicon-silicon carbide-based composite material, silicon nitride, a cordierite forming raw material, mullite, alumina, a silicon carbide cordierite-based composite material, and aluminium titanate is preferred. Furthermore, the cordierite forming raw material indicates a raw material which becomes cordierite by firing. Specifically, the cordierite forming raw material indicates a raw material kneaded according to a chemical composition in which a mass ratio of silica to 100 mass % of the raw material is from 42 to 56 mass %, a mass ratio of alumina to 100 mass % of the raw material is from 30 to 45 mass %, and a mass ratio of magnesia to 100 mass % of the raw material is from 12 to 16 mass %.

It is desirable to prepare the forming raw material by mixing a dispersing medium, a sintering additive, an organic binder, a surfactant, and a pore former or the like with the ceramic raw material.

As the dispersing medium, water is preferably used. The content of the dispersing medium is appropriately adjusted so as to obtain a hardness in which the kneaded material obtained by kneading the forming raw material is easily molded. As the content of the specific dispersing medium, a mass ratio of the dispersing medium to 100 mass % of the forming raw material is preferably from 20 to 80 mass %.

As the sintering additive, for example, yttria, magnesia, strontium oxide, or the like can be used. As the content of the sintering additive, a mass ratio of the sintering additive to 100 mass % of the forming raw material is preferably from 0.1 to 0.3 mass %.

As the organic binder, for example, methylcellulose, hydroxypropoxylcellulose, hydroxyethylcellulose, carboxymethylcellulose, and polyvinylalcohol or the like can be exemplified. Among these, it is desirable to use a combination of methylcellulose and hydroxypropoxylcellulose. A mass ratio of the binder to 100 mass % of the forming raw material is preferably from 2 to 10 mass %.

As the surfactant, ethyleneglycol, dextrin, fatty acid soap, and polyalcohol or the like can be used. These examples may be used alone or as a combination of two or more examples. A mass ratio of the surfactant to 100 mass % of the forming raw material is preferably 2 mass % or less.

The pore former is not particularly limited as long as a pore is formed by firing. For example, graphite, starch, foamable resin, hollow resin, water absorbable resin, silica gel, and the like can be exemplified. A mass ratio of the pore former to 100 mass % of the forming raw material is preferably 10 mass % or less.

Next, a kneaded material is formed by kneading the forming raw material. A method of forming the kneaded material by kneading the forming raw material is not particularly limited. For example, a method using a kneader and a vacuum pugmill or the like can be exemplified.

Subsequently, a honeycomb formed body is formed by molding the obtained kneaded material. The honeycomb formed body is a formed body which includes a partition wall defining a plurality of cells functioning as fluid channels. A method of forming the honeycomb formed body by molding the kneaded material is not particularly limited, and an existing molding method such as extrusion and injection molding can be employed. For example, a method of extruding the kneaded material by a die having a desired cell shape and a desired partition wall thickness can be exemplified as an appropriate example. As a material of the die, hardly abraded cemented carbide is preferred.

The honeycomb formed body obtained in this way is dried and fired. As a drying method, for example, a hot air drying method, a micro wave drying method, a dielectric drying method, a decompression drying method, a vacuum drying method, a freeze drying method, and the like can be exemplified. Among theses, it is desirable to perform each of the dielectric drying method, the micro wave drying method, and the hot air drying method or a combination thereof.

Subsequently, the dried honeycomb formed body (the honeycomb dried body) is fired so as to manufacture a honeycomb substrate. Furthermore, it is desirable to perform calcinating (degreasing) in order to remove a binder contained in the honeycomb formed body before the firing (the main firing). The calcinating condition is not particularly limited, and a condition may be used which can remove organic matter (an organic binder, a surfactant, and a pore former) contained in the honeycomb formed body. In general, a burning temperature of an organic binder is about 100 to 300° C. and a burning temperature of a pore former is about 200 to 800° C. For that reason, it is desirable to heat the honeycomb formed body at about 200 to 1000° C. in an oxidized atmosphere for about 3 to 100 hours as the calcinating condition.

The firing (main firing) of the honeycomb formed body is performed so that the forming raw material constituting the calcinated honeycomb formed body is sintered to be densified and predetermined strength is ensured. Since the firing condition (the temperature, the time, or the atmosphere) is different in accordance with the type of the forming raw material, the firing condition can be selected appropriately in response to the type. For example, the firing temperature is preferably from 1350 to 1440° C. when the cordierite forming raw material is used. Further, the firing time is preferably from 3 to 10 hours as a keeping time at the maximum temperature. As a device for calcinating and main firing, an electric furnace and a gas furnace or the like can be exemplified.

Next, a plugging portion is formed in the honeycomb substrate. The plugging portion is formed near the outflow side end face of the honeycomb substrate in the outlet plugging cell so that the end is plugged, and is formed near the inflow side end face of the honeycomb substrate in the inlet plugging cell so that the end is plugged. In order to form the plugging portion, an existing method can be used. As an example of a specific method, first, a sheet is attached to the end face of the honeycomb substrate manufactured according to the above method. Subsequently, a hole is formed in the sheet at a position corresponding to the cell to be provided with the plugging portion. Next, the end face of the honeycomb substrate having the sheet attached thereto is immersed into plugging slurry obtained from a plugging portion forming material so that the plugging slurry is charged into the opening end of the cell to be plugged through the hole formed in the sheet. The plugging slurry charged in this way is dried, fired to harden so as to form the plugging portion. As the plugging portion forming material, a material similar to the honeycomb substrate forming material is preferably used. Furthermore, it is to be noted that the plugging portions may be formed in any stage after the drying, calcinating or firing (main firing) of the honeycomb formed body. By the above manufacturing method, the honeycomb filter of the present invention can be obtained.

(3) Loading Method of Catalyst:

Next, an example of a loading method of a catalyst on the partition wall of the honeycomb filter manufactured as described above will be described. First, catalyst slurry containing a catalyst to be loaded is prepared. The catalyst slurry is coated on the partition wall of the honeycomb substrate. The coating method is not particularly limited. For example, An example of the method is preferably a method (a suction method) in which the catalyst slurry is suctioned from the other end face of the honeycomb substrate while one end face of the honeycomb substrate is immersed into the catalyst slurry. In this way, the catalyst slurry is coated on the partition wall of the honeycomb substrate and the catalyst slurry is dried. Further, the dried catalyst slurry may be fired. In this way, it is possible to obtain the honeycomb filter that a catalyst is loaded on the partition wall.

EXAMPLES

Hereinafter, the invention will be described in detail based on examples, but the invention is not limited to these examples.

Examples 1 and 2 and Comparative Examples 1 to 3

Honeycomb filters of Examples 1, 2 and Comparative Examples 1 to 3 having a structure shown in Table 2 and formed of a material a having a porosity, an average pore diameter, a thermal expansion coefficient (A), and a four-point bending strength (B) shown in Table 1 were manufactured. Furthermore, the porosity, the average pore diameter, the thermal expansion coefficient (A), and the four-point bending strength (B) shown in Table 1 are values measured according to the above method for the material constituting a portion (a honeycomb substrate) other than a plugging portion of the honeycomb filter. CW1 and CW2 of Table 2 respectively indicate the width of an outlet plugging cell and the width of an inlet plugging cell in a direction in which the outlet plugging cell and the inlet plugging cell are alternately disposed in a cross-section orthogonal to the extension direction of the cell (see FIG. 4). The honeycomb filter includes a honeycomb substrate which includes a porous partition wall defining a plurality of cells functioning as fluid channels and extending from an inflow end face to an outflow end face and a plugging portion which is disposed in at least one end near the inflow side end face or the outflow side end face in the plurality of cells. A part of the plurality of cells is an inlet plugging cell of which an end is plugged by the plugging portion at the inflow side end face of the honeycomb substrate. Further, the other of the plurality of cells is an outlet plugging cell of which an end is plugged by the plugging portion at the outflow side end face of the honeycomb substrate. In a cross-section orthogonal to the extension direction of the cell, the cross-sectional area of the outlet plugging cell is larger than the cross-sectional area of the inlet plugging cell. The outlet plugging cell and the inlet plugging cell are disposed alternately while being partitioned by the partition wall in two orthogonal directions in a cross-section orthogonal to the extension direction of the cell. Further, the outlet plugging cells are disposed so that the outlet plugging cells are continuously and adjacently disposed while being partitioned by the partition wall in a direction inclined to two orthogonal directions in the cross-section.

Furthermore, the material a is a silicon-silicon carbide-based composite material in which SiC particles as an aggregate are coupled by Si as a binder. The honeycomb substrate constituting the honeycomb filter was manufactured by a square-pillar-shaped honeycomb segment of which both end faces had rectangular shapes of 36 mm×36 mm and the length was 152.4 mm. Specifically, sixteen honeycomb segments were monolithically combined and bonded according to the arrangement of 4×4 lengthwise and breadthwise in a direction orthogonal to the longitudinal direction, the outer circumference was ground in a round pillar shape, a coating material was applied to the processed face so as to form an outer circumferential coating layer thereon, and hence the honeycomb substrate was obtained. The diameter of the honeycomb substrate was 143.8 mm. In order to bond the honeycomb segments, a bonding material was used which included an aluminosilicate fiber of 30 pts·mass, SiC particles of 30 pts·mass, and water of 30 pts·mass and further included an organic binder, foamable resin, and a dispersing agent as residual parts. The plugging portion and the outer circumferential coating layer were formed of materials similar to the honeycomb substrate. In a cross-section orthogonal to the extension direction of the cell, the cross-sectional shape of the outlet plugging cell is an octagonal shape and the cross-sectional shape of the inlet plugging cell is a rectangle shape (a square shape).

Examples 3 to 5 and Comparative Examples 4 to 6

Honeycomb filters of Examples 3 to 5 and Comparative Examples 4 to 6 were manufactured similarly to Examples 1, 2 and Comparative Examples 1 to 3 except that the honeycomb filters had a structure shown in Table 2 and were formed of a material b having the porosity, the average pore diameter, the thermal expansion coefficient (A), and the four-point bending strength (B) shown in Table 1. Furthermore, the material b is a silicon-silicon carbide-based composite material obtained by binding SiC particles as an aggregate by Si as a binder.

Examples 6, 7 and Comparative Examples 7 to 10

Honeycomb filters of Examples 6, 7 and Comparative Examples 7 to 10 were manufactured similarly to Examples 1, 2 and Comparative Examples 1 to 3 except that the honeycomb filters had a structure shown in Table 2 and were formed of a material c having the porosity, the average pore diameter, the thermal expansion coefficient (A), and the four-point bending strength (B) shown in Table 1. Furthermore, the material c is a silicon-silicon carbide-based composite material obtained by binding SiC particles as an aggregate by Si as a binder.

Examples 8, 9 and Comparative Examples 11 and 12

Honeycomb filters of Examples 8, 9 and Comparative Examples 11, 12 were manufactured similarly to Examples 1, 2 and Comparative Examples 1 to 3 except that the honeycomb filters had a structure shown in Table 2 and were formed of a material d having the porosity, the average pore diameter, the thermal expansion coefficient (A), and the four-point bending strength (B) shown in Table 1. Furthermore, the material d is a silicon carbide-based composite material obtained by binding SiC particles as an aggregate by oxides of Al, Mg, and Si as binders.

Examples 10, 11 and Comparative Examples 13, 14

Honeycomb filters of Examples 10, 11 and Comparative Examples 13, 14 were manufactured similarly to Examples 1, 2 and Comparative Examples 1 to 3 except that the honeycomb filters had a structure shown in Table 2 and were formed of a material e having the porosity, the average pore diameter, the thermal expansion coefficient (A), and the four-point bending strength (B) shown in Table 1. Furthermore, the material e is a silicon-silicon carbide-based composite material obtained by binding SiC particles as an aggregate by Si as a binder.

(Evaluation)

The honeycomb filters of Examples 1 to 11 and Comparative Examples 1 to 14 were evaluated in the "cracking resistance" and the "pressure loss increase rate" according to the following method.

(Cracking Resistance)

At a vibration condition of a vibration acceleration of 30 G and a vibration frequency of 100 Hz, a gas was caused to flow into the honeycomb filter while an axial vibration was applied thereto. A cycle was repeated 50 times in which the temperature of the gas was increased from 150° C. to 800° C. for 10 minutes and was decreased from 800° C. to 150° C. for 10 minutes. The flow rate of the gas was set to 2.0 Nm³/minute during an increase in temperature and was set to 0.5 Nm³/minute during a decrease in temperature. Subsequently, both end faces of the honeycomb filter were observed by a loupe of 20 times. Then, the existence of the crack and the crack state at the intersection point of the partition wall were examined and were evaluated according to the following references.

A indicates a state where no crack exists.

B indicates a state where a crack exists only at one cell.

C indicates a state where a crack exists in two or more cells.

The evaluation result is shown in Table 2. Further, a graph representing a relation between t/CP and A/B involved with the cracking resistance was created based on the evaluation result and shown in FIG. 7. Furthermore, a line L1 of FIG. 7 indicates a boundary line drawn so as to distinguish a thing of evaluation A or B from a thing of evaluation C, and a line L2 indicates a boundary line drawn so as to distinguish a thing of evaluation A from a thing of evaluation B or C. The line L1 can be expressed by the following equation (5) and the line L2 can be expressed by the following equation (6).

$$t/CP = 0.163 \times A/B + 0.105 \quad (5)$$

$$t/CP = 0.145 \times A/B + 0.160 \quad (6)$$

Figure 7:
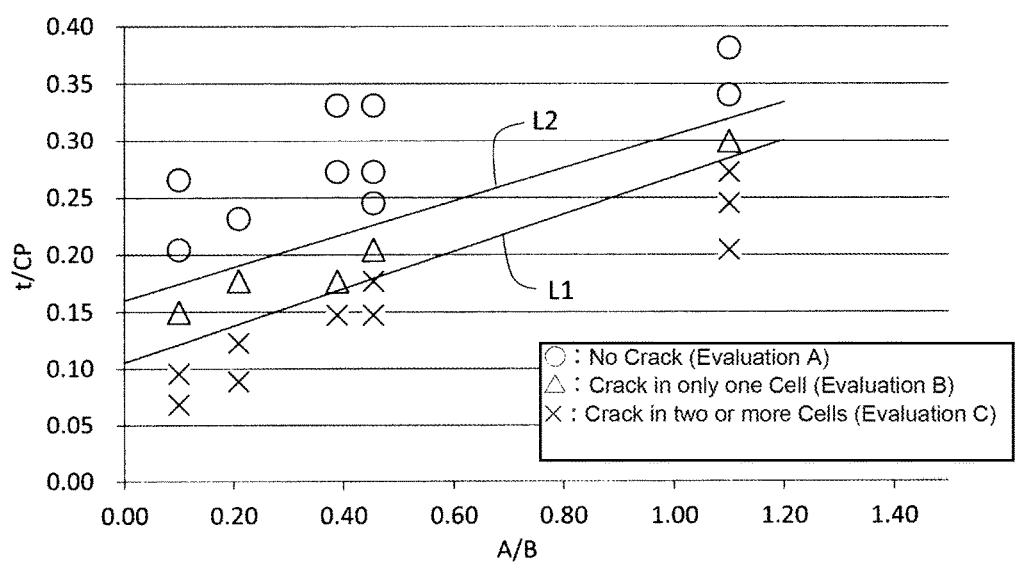
FIG. 7 is a graph showing a relation between t/CP and A/B for a cracking resistance based on cracking resistance evaluation results of Examples 1 to 11 and Comparative Examples 1 to 14.

The thing of evaluation A or B exists in an area above the line L1 of FIG. 7, and the thing of evaluation A exists in an area above the line L2 of FIG. 7. That is, in order to obtain the honeycomb filter having high cracking resistance and excellent thermal shock resistance, the lower limit of t/CP needs to be equal with the value to be provided by the following expression: $0.163 \times A/B + 0.105$ and preferably needs to be equal with the value to be provided by the following expression: $0.145 \times A/B + 0.160$.

(Pressure Loss Increase Rate)

By using a soot generator generating soot by a burner using gas oil as fuel, an exhaust gas including soot of 200° C. was generated. The exhaust gas was caused to flow into the honeycomb filter at the flow rate of 2.4 Nm³/minute and the pressure loss of the honeycomb filter obtained when the amount of soot accumulated inside the honeycomb filter became 4 g/L per unit volume of the honeycomb filter. The pressure loss indicates a pressure difference between the upstream pressure and the downstream pressure of the honeycomb filter. From this measurement value, as for the honeycomb filters of Example and Comparative Example in which the structure and the material were similar except t and t/CP, the pressure loss of the honeycomb filter of the other examples or comparative examples were obtained when the pressure loss of the honeycomb filter of Example or Comparative Example satisfying a relation of t=WT was set to 100%.

That is, in the honeycomb filters of Examples 1, 2 and Comparative Examples 1 to 3, the pressure loss values (the relative values) of the honeycomb filter of Examples 1, 2 and Comparative Examples 2, 3 were obtained when the pressure loss of the honeycomb filter of Comparative Example 1 was set to 100%. Further, in the honeycomb filters of Example 3 and Comparative Examples 4 to 6, the pressure loss values (the relative values) of the honeycomb filters of Example 3 and Comparative Examples 5, 6 were obtained when the pressure loss of the honeycomb filter of Comparative Example 4 was set to 100%. Further, in the honeycomb filters of Examples 4, 5, the pressure loss value (the relative value) of the honeycomb filter of Example 5 was obtained when the pressure loss of the honeycomb filter of Example 4 was set to 100%. Further, in the honeycomb filters of Examples 6, 7 and Comparative Examples 7 to 10, the pressure loss values (the relative values) of the honeycomb filters of Examples 6, 7 and Comparative Examples 8 to 10 were obtained when the pressure loss of the honeycomb filter of Comparative Example 7 was set to 100%. Further, in the honeycomb filters of Examples 8, 9 and Comparative Examples 11, 12, the pressure loss values (the relative values) of the honeycomb filters of Examples 8, 9 and Comparative Example 12 were obtained when the pressure loss of the honeycomb filter of Comparative Example 11 was set to 100%. Further, in the honeycomb filters of Examples 10, 11 and Comparative Examples 13, 14, the pressure loss values (the relative values) of the honeycomb filters of Examples 10, 11 and Comparative Example 14 were obtained when the pressure loss of the honeycomb filter of Comparative Example 13 was set to 100%.

Then, a value obtained by subtracting the pressure loss (100%) of the honeycomb filter of an example or a comparative example satisfying a relation of t=WT from the pressure loss (the relative value) of the honeycomb filter of other examples or comparative examples was shown as a pressure loss increase rate in Table 2. Further, a relational expression of t/CP and WT when the pressure loss increase rate became 30%, 25%, or 20% respectively was obtained by the multi-variable analysis of the pressure loss increase rate of the honeycomb filter of Examples 1 to 11 and Comparative Examples 1 to 14. The obtained relational expression was the following equation (7) when the pressure loss increase rate was 30%, the following equation (8) when the pressure loss increase rate was 25%, and the following equation (9) when the pressure loss increase rate was 20%.

$$t/CP = 0.714 \times WT + 0.160 \quad (7)$$

$$t/CP = 0.714 \times WT + 0.132 \quad (8)$$

$$t/CP = 0.714 \times WT + 0.104 \quad (9)$$

In the honeycomb filter in which the pressure loss increase rate exceeds 30%, the pressure loss caused by the accumulation of soot increases violently in an actual use state. Thus, there is a concern for an influence on the engine output. For that reason, it is difficult to use the honeycomb filter as a PM trapping filter such as DPF. In order to use the honeycomb filter as the PM trapping filter such as DPF, the pressure loss increase rate needs to be equal to or smaller than 30%. That is, the upper limit of t/CP needs to be equal with the value to be provided by the following expression: 0.714×WT+0.160. Further, in order to use the honeycomb filter as the PM trapping filter such as DPF, the pressure loss increase rate is preferably equal to or smaller than 25%. That is, the upper limit of t/CP is preferably equal with the value to be provided by the following expression: 0.714×WT+0.132. Further, in order to use the honeycomb filter as the PM trapping filter such as DPF, the pressure loss increase rate is further preferably equal to or smaller than 20%. That is, the upper limit of t/CP is further preferably equal with the value to be provided by the following expression: 0.714×WT+0.104.

TABLE 1

|  | POROSITY (%) | AVERAGE PORE DIAMETER (μm) | THERMAL EXPANSION COEFFICIENT (A) (×10$^{-6}$/° C.) | FOUR-POINT BENDING STRENGTH (B) (MPa) | A/B |
|---|---|---|---|---|---|
| MATERIAL a | 40 | 15 | 4.5 | 45 | 0.10 |
| MATERIAL b | 65 | 20 | 5.0 | 11 | 0.45 |
| MATERIAL c | 70 | 20 | 5.5 | 5 | 1.10 |
| MATERIAL d | 68 | 20 | 3.5 | 9 | 0.39 |
| MATERIAL e | 55 | 15 | 4.2 | 20 | 0.21 |

TABLE 2

|  | MATERIAL | A (×10$^{-6}$/° C.) | B (MPa) | A/B | WT (mm) | CP (mm) | CW1/CW2 | t (mm) | t/CP | CRACKING RESISTANCE | PRESSURE LOSS (%) | PRESSURE LOSS INCREASE RATE (%) |
|---|---|---|---|---|---|---|---|---|---|---|---|---|
| COMPARATIVE EXAMPLE 1 | a | 4.5 | 45 | 0.10 | 0.10 | 1.47 | 1.2 | 0.10 | 0.068 | C | 100 | 0 |
| COMPARATIVE EXAMPLE 2 | a | 4.5 | 45 | 0.10 | 0.10 | 1.47 | 1.2 | 0.14 | 0.095 | C | 107 | 7 |
| EXAMPLE 1 | a | 4.5 | 45 | 0.10 | 0.10 | 1.47 | 1.2 | 0.22 | 0.150 | B | 117 | 17 |
| EXAMPLE 2 | a | 4.5 | 45 | 0.10 | 0.10 | 1.47 | 1.2 | 0.30 | 0.204 | A | 128 | 28 |
| COMPARATIVE EXAMPLE 3 | a | 4.5 | 45 | 0.10 | 0.10 | 1.47 | 1.2 | 0.39 | 0.265 | A | 139 | 39 |
| COMPARATIVE EXAMPLE 4 | b | 5.0 | 11 | 0.45 | 0.20 | 1.36 | 1.2 | 0.20 | 0.147 | C | 100 | 0 |
| COMPARATIVE EXAMPLE 5 | b | 5.0 | 11 | 0.45 | 0.20 | 1.36 | 1.2 | 0.24 | 0.176 | C | 106 | 6 |
| EXAMPLE 3 | b | 5.0 | 11 | 0.45 | 0.20 | 1.36 | 1.2 | 0.37 | 0.272 | B | 121 | 21 |
| COMPARATIVE EXAMPLE 6 | b | 5.0 | 11 | 0.45 | 0.20 | 1.36 | 1.2 | 0.45 | 0.331 | A | 132 | 32 |
| EXAMPLE 4 | b | 5.0 | 11 | 0.45 | 0.30 | 1.47 | 1.3 | 0.30 | 0.204 | A | 100 | 0 |
| EXAMPLE 5 | b | 5.0 | 11 | 0.45 | 0.30 | 1.47 | 1.3 | 0.36 | 0.245 | A | 107 | 7 |
| COMPARATIVE EXAMPLE 7 | c | 5.5 | 5 | 1.10 | 0.30 | 1.47 | 1.3 | 0.30 | 0.204 | C | 100 | 0 |
| COMPARATIVE EXAMPLE 8 | c | 5.5 | 5 | 1.10 | 0.30 | 1.47 | 1.3 | 0.36 | 0.245 | C | 108 | 8 |
| COMPARATIVE EXAMPLE 9 | c | 5.5 | 5 | 1.10 | 0.30 | 1.47 | 1.3 | 0.40 | 0.272 | C | 112 | 12 |
| EXAMPLE 6 | c | 5.5 | 5 | 1.10 | 0.30 | 1.47 | 1.3 | 0.44 | 0.299 | B | 117 | 17 |
| EXAMPLE 7 | c | 5.5 | 5 | 1.10 | 0.30 | 1.47 | 1.3 | 0.50 | 0.340 | A | 124 | 24 |
| COMPARATIVE EXAMPLE 10 | c | 5.5 | 5 | 1.10 | 0.30 | 1.47 | 1.3 | 0.56 | 0.381 | A | 133 | 33 |
| COMPARATIVE EXAMPLE 11 | d | 3.5 | 9 | 0.39 | 0.20 | 1.36 | 1.2 | 0.20 | 0.147 | C | 100 | 0 |
| EXAMPLE 8 | d | 3.5 | 9 | 0.39 | 0.20 | 1.36 | 1.2 | 0.24 | 0.176 | B | 107 | 7 |
| EXAMPLE 9 | d | 3.5 | 9 | 0.39 | 0.20 | 1.36 | 1.2 | 0.37 | 0.272 | A | 120 | 20 |
| COMPARATIVE EXAMPLE 12 | d | 3.5 | 9 | 0.39 | 0.20 | 1.36 | 1.2 | 0.45 | 0.331 | A | 132 | 32 |
| COMPARATIVE EXAMPLE 13 | e | 4.2 | 20 | 0.21 | 0.13 | 1.47 | 1.2 | 0.13 | 0.088 | C | 100 | 0 |
| COMPARATIVE EXAMPLE 14 | e | 4.2 | 20 | 0.21 | 0.13 | 1.47 | 1.2 | 0.18 | 0.122 | C | 108 | 8 |
| EXAMPLE 10 | e | 4.2 | 20 | 0.21 | 0.13 | 1.47 | 1.2 | 0.26 | 0.177 | B | 117 | 17 |
| EXAMPLE 11 | e | 4.2 | 20 | 0.21 | 0.13 | 1.47 | 1.2 | 0.34 | 0.231 | A | 127 | 27 |

(Result)

In the honeycomb filters of Examples 1 to 11 in which the value of t/CP was equal to or larger than the value to be provided by the following expression: 0.163×A/B+0.105 and equal to or smaller than the value to be provided by the following expression: 0.714×WT+0.160, the cracking resistance evaluation was A or B and the pressure loss increase rate was equal to or smaller than 30%. Meanwhile, in the honeycomb filters of Comparative Examples 1, 2, 4, 5, 7 to 9, 11, 13, and 14 in which the value of t/CP was smaller than the value to be provided by the following expression: 0.163×A/B+0.105, the cracking resistance evaluation was C. Further, in the honeycomb filters of Comparative Examples 3, 6, 10, and 12 in which the value of t/CP was larger than the value to be provided by the following expression: of 0.714×WT+0.160, the pressure loss increase rate exceeded 30%.

The honeycomb filter of the present invention can be appropriately used as a honeycomb filter that removes PM or the like in an exhaust gas emitted from an internal combustion engine such as a diesel engine.

DESCRIPTION OF REFERENCE NUMERALS

1: partition wall, 2: cell, 2a: outlet plugging cell, 2b: inlet plugging cell, 3: plugging portion, 10: honeycomb substrate, 11: inflow end face, 12: outflow end face, 100: honeycomb filter, G: exhaust gas

What is claimed is:

1. A honeycomb filter comprising:
    a honeycomb substrate which includes a porous partition wall defining a plurality of cells functioning as fluid channels and extending from an inflow end face as an end face to which a fluid flows to an outflow end face as an end face from which a fluid flows; and
    a plugging portion which is disposed in any one end of the inflow side end face and the outflow side end face in the plurality of cells,
    wherein a part of the plurality of cells is an inlet plugging cell of which an end near the inflow side end face of the honeycomb substrate is plugged by the plugging portion and the other of the plurality of cells is an outlet plugging cell of which an end near the outflow side end face of the honeycomb substrate is plugged by the plugging portion,
    wherein in a cross-section orthogonal to the extension direction of the cell, the cross-sectional area of the outlet plugging cell is larger than the cross-sectional area of the inlet plugging cell,
    wherein the outlet plugging cell and the inlet plugging cell are disposed alternately and adjacently while being partitioned by the partition wall in two orthogonal directions in the cross-section and the outlet plugging cells are continuously and adjacently disposed while being partitioned by the partition wall in a direction in which the outlet plugging cells are inclined with respect to two orthogonal directions in the cross-section,
    wherein when the thermal expansion coefficient at 300 to 600° C. of a material constituting the honeycomb substrate is indicated by A ($\times 10^{-6}/°$ C.), the four-point bending strength of the material constituting the honeycomb substrate is indicated by B (MPa), the thickness of a thinnest portion in a portion partitioning the outlet plugging cells in the partition wall is indicated by t (mm), the thickness of a portion partitioning the outlet plugging cell and the inlet plugging cell in the partition wall is indicated by WT (mm), and the distance between the center of the outlet plugging cell and the center of the inlet plugging cell adjacent to each other is indicated by CP (mm), a relation of the following equation (1) is satisfied $$0.714 \times WT + 0.160 \geq t/CP \geq 0.163 \times A/B + 0.105 \qquad (1).$$

2. The honeycomb filter according to claim 1,
    wherein a relation of the following equation (2) is satisfied $$t/CP \geq 0.145 \times A/B + 0.160 \qquad (2).$$

3. The honeycomb filter according to claim 1,
    wherein a relation of the following equation (3) is satisfied $$0.714 \times WT + 0.132 \geq t/CP \qquad (3).$$

4. The honeycomb filter according to claim 1,
    wherein a relation of the following equation (4) is satisfied $$0.714 \times WT + 0.104 \geq t/CP \qquad (4).$$

5. The honeycomb filter according to claim 1,
    wherein the honeycomb substrate is obtained by monolithically bonding a plurality of segments having a honeycomb structure.

6. The honeycomb filter according to claim 1,
    wherein a material constituting the honeycomb substrate is ceramics of at least one selected from the group consisting of silicon carbide, a silicon-silicon carbide-based composite material, silicon nitride, cordierite, mullite, alumina, a silicon carbide cordierite-based composite material, and aluminium titanate.

7. The honeycomb filter according to claim 1,
    wherein a portion partitioning the outlet plugging cells in the partition wall has a non-uniform thickness.

8. The honeycomb filter according to claim 1,
    wherein an exhaust gas purifying catalyst is loaded onto the partition wall.

* * * * *